Jan. 2, 1951     H. A. KNOX     2,536,064
ROLLER BEARING TRACK SHOE
Filed Sept. 24, 1947     2 Sheets-Sheet 1
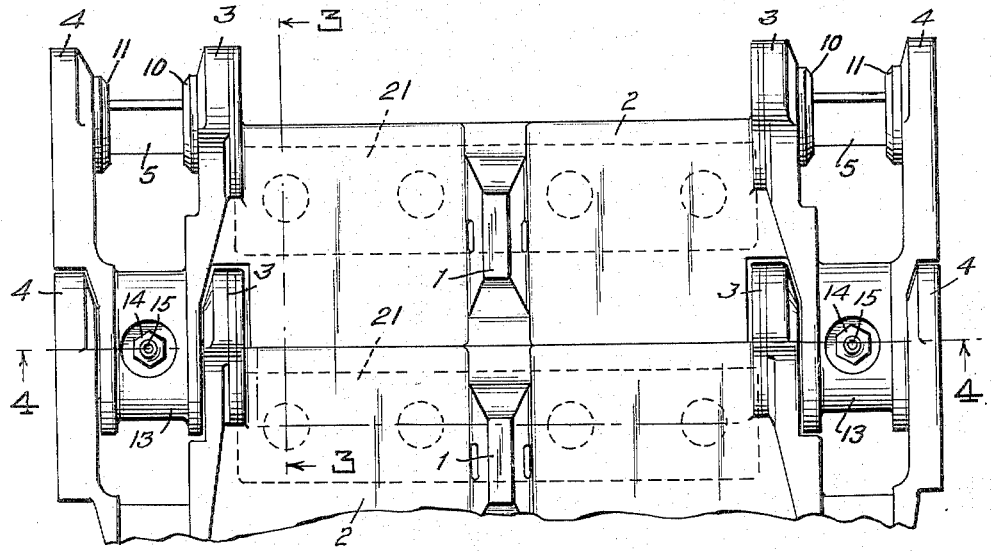
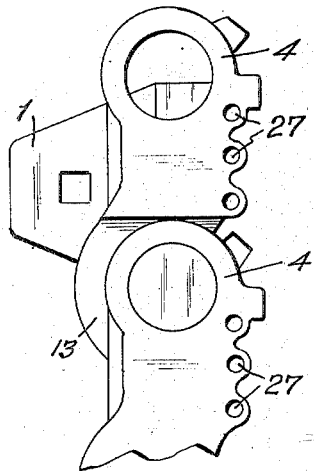 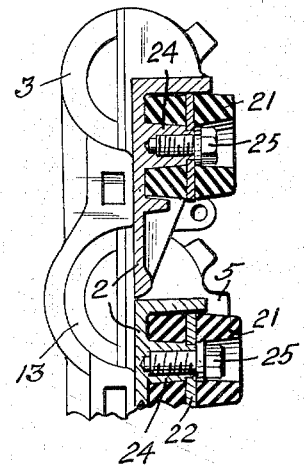
Inventor
Harry A. Knox
By J. H. Church & W. E. Thibodeau
Attorneys

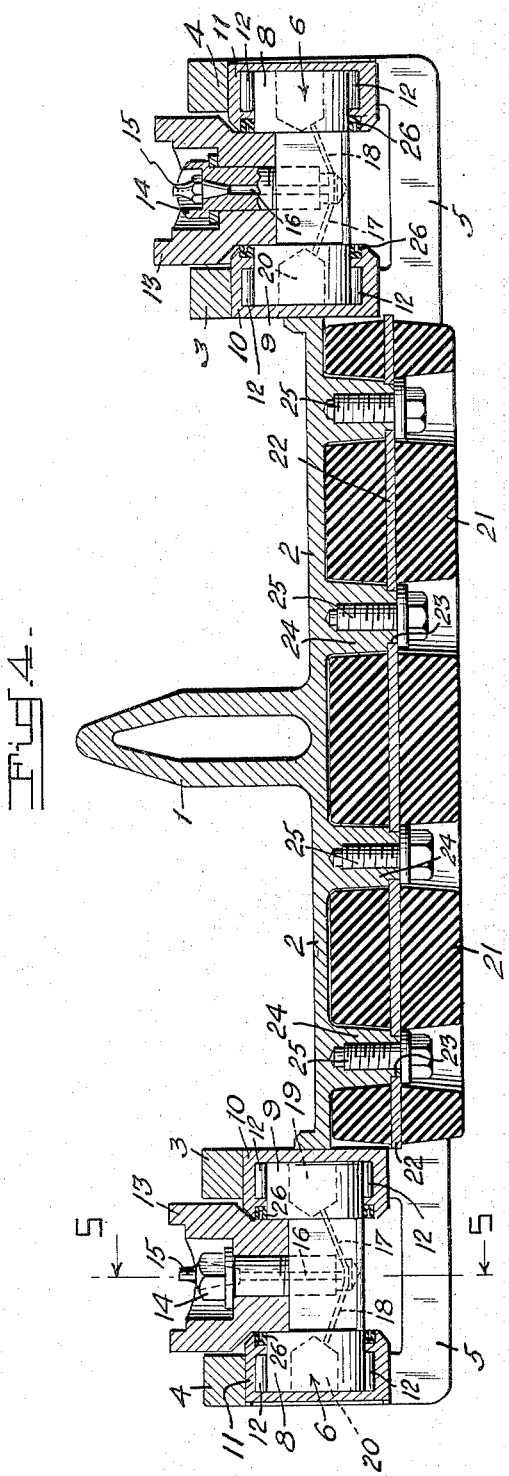
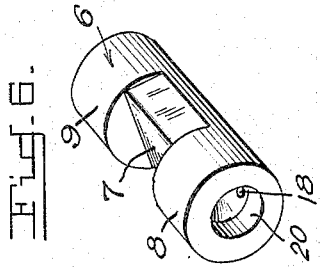
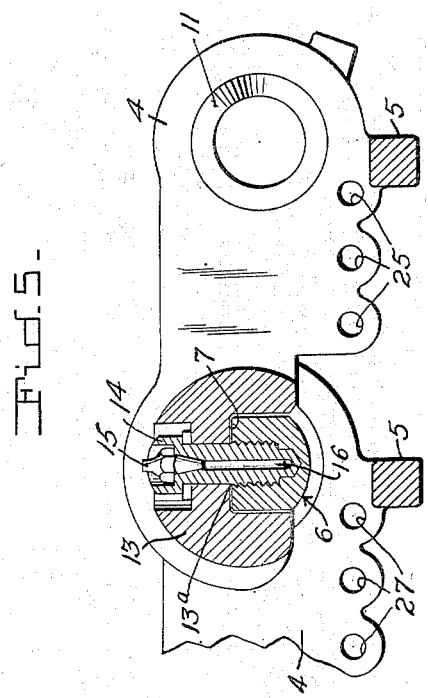

Patented Jan. 2, 1951

2,536,064

UNITED STATES PATENT OFFICE 2,536,064

ROLLER BEARING TRACK SHOE

Harry A. Knox, Washington, D. C.

Application September 24, 1947, Serial No. 775,819

10 Claims. (Cl. 305—10)

(Granted under the act of March 3, 1883, as amended April 30, 1928; 370 O. G. 757)

The invention described herein may be manufactured and used by or for the Government for governmental purposes without the payment of any royalty thereon.

This invention relates to a track shoe for tracklaying vehicles. In the known vehicles of this type common defects reside in vibrations, and resistance which result in loosening and breakage of vehicle parts. Further undesirable features are throwing of tracks, track stretch, lateral bending, pinching, and cracking of rubber parts and the lack of provision for side thrust in the pins.

All such undesirable features are ameliorated by the present invention by provision of roller bearings on the pins and a low rail positioned to engage the idler and bogie wheels on a line substantially coaxial with the pins.

It is therefore an object of the invention to provide a track shoe for tracklaying vehicles which shall be smooth, free and vibrationless in operation. Still further objects are to provide a track shoe having a low rail and to provide a pin having provision for roller bearings and side thrust bearings.

Other objects will be apparent from the accompanying specification taken in conjunction with the drawings in which like reference characters represent like parts throughout, and in which:

Fig. 1 is a top plan view of a pair of connected track shoes,

Fig. 2 is a side view thereof,

Fig. 3 is a section taken on the line 3—3 of Fig. 1,

Fig. 4 is a section on an enlarged scale taken on the line 4—4 of Fig. 1,

Fig. 5 is a section to the same scale as Figure 4 taken on the line 5—5 of Fig. 4, and Fig. 6 is a perspective of one of the track shoe pins.

In its general character the track shoe is of the single-pin, hook type shown and claimed in my copending application for Track Shoe with Hook Connection, Serial No. 770,702, filed on August 26, 1947, wherein an extremity of one shoe is hooked over the complementary extremity of the adjacent shoe and fastened in place.

Since the track shown in the drawings is symmetrical about the center line, only one side need be described. A guide member 1 is located centrally of the shoe, occurring as a raised portion of the main body wheel-engaging portion 2. Portion 2 will be noted to be generally rectangular in outline and has parallel first and second longitudinal edges shown as horizontal upon Figure 1. At the extremity of the shoe is a bearing housing consisting of a two part sleeve 3—4. A grouser 5 is integral with and connects the sleeve parts. Within the sleeve 3—4 is a pin 6 having a flat mid portion 7, and cylindrical ends, 8, 9. Closed bushings, 10 and 11, are snugly fitted into sleeves 3 and 4 and held as by peening. Needle bearings 12 support the pin ends in the bushings.

Joining the sleeves 3 and 4 is a hook member 13 medially of the sleeves and longitudinally spaced therefrom and adapted to fit between the pair of sleeves of an adjacent shoe. The hook member 13 has a flat base in its open portion to mate with the flat portion 7 of the pin 6 and is fastened thereto by a cap screw 14. Screw 14 has a lubrication fitting 15 and bore 16 which communicates with channels 17, 18 and chambers 19, 20 in the pin 6.

Detachable rubber blocks such as 21, having a central metallic holding plate 22, perforations 23, the plate extending to provide flanges, may be provided. These are secured against shoulders on bosses such as 24 by cap screws 25. The blocks, which save wear on the grousers on smooth, hard roads are readily applied and detached and are reversible.

On the ends of the shoe, holes 27 may be provided for bolting on side extensions for the shoe.

In assembly, the pins 6 are fitted in the sleeves 3, 4 together with the bearings, end-closed bushings and oil seals 26. It is then only necessary to insert and turn down cap screws 14 to fasten each hook portion to the pin 6 of each succeeding shoe to assemble the track, and detachment is as simple in the reverse sense.

It will be seen that there has been herein provided a track shoe in which friction, stretch, heat and wear are reduced to a minimum; the low rail on the center of the pins eliminates vibration; side thrust loads are taken up; the shoes can be changed without disturbing the bearings and closures or track pins by merely removing two screws in each; welding and brazing are eliminated; throwing of tracks is minimized; maximum grouser and cleaning action is obtained; the absence of rubber bushings eliminates track static and static clips; fuel is saved, and speed gained.

Having thus described my invention, what I claim as new and desire to secure by Letters Patent is:

1. A track shoe for tracklaying vehicles comprising a planar main body portion, a pair of axially spaced sleeves at each lateral edge of one longitudinal extremity of the body portion, a bushing secured in each sleeve, the bushings of each pair having their confronting ends open and their remote ends closed, anti-friction bearings in each bushing, a pin supported on the bearings in each pair of bushings and being cut away intermediate its ends to form a flat portion parallel to its axis, a pin-fastening member at each lateral edge of the body portion at the other extremity of the main body portion each member comprising a hook-shaped element laterally aligned between the corresponding pair of sleeves on the opposite extremity, said elements having flat portions complementary to the flat portions on the pins, the axis of said pins and the pin axis defined by said hook-shaped elements being substantially coplanar with the wheel-engaging surface of said main body portion.

2. A one-piece track shoe for track-laying vehicles comprising a planar main body portion, a pair of axially spaced sleeves at each lateral edge of one longitudinal extremity of the body portion, a bushing fixed in each sleeve, the bushings of each pair of sleeves having their remote ends closed, anti-friction bearings in each bushing, a pin supported on the bearings in each pair of bushings, each pin having an intermediate portion cut away to provide a flat portion parallel to its axis, a hook member at each lateral edge of the body portion at the other extremity of the main body portion and laterally aligned between the corresponding pair of sleeves on the opposite extremity, each said hook member being shaped to hook over and fit the pin of a next succeeding shoe and having a flat portion fitting over and mating with the flat portion of its pin.

3. In a track shoe for a track-laying vehicle, a main wheel-engaging portion generally rectangular in outline and having first and second parallel longitudinal edges, a pair of spaced bearing sleeves at one end of said portion having their common axis substantially coincident with said first edge, said sleeves being adapted to journal a bearing pin therein, a hook member for connection with the bearing pin of a next adjacent shoe, and a strap means extending from each said sleeve and mounting said hook member between them with its axis in substantial alignment with said second edge, said portion, sleeves, hook member and strap means being integral.

4. A track shoe for the belt of a track-laying vehicle comprising a main wheel-engaging portion having first and second parallel longitudinal edges, a pair of spaced bearing sleeves at one longitudinal extremity of said portion in alignment with said first edge, a bushing in each sleeve, said bushings having their remote ends closed, an anti-friction bearing in each bushing, a pin having its ends journaled in said bearings, a hook member for hooking over the pin of a next adjacent shoe, and straps extending from each said sleeve and mounting said hook member between them at their ends, said hook member having its central axis in alignment with said second edge, each said hook member and pin having mating non-circular surfaces, and means operable to rigidly attach each hook member in mating relation with the pin of a next adjacent shoe, whereby all relative pivotal movement of consecutive shoes takes place about axes substantially coincident with said first and second edges.

5. A track shoe for tracklaying vehicles comprising a main body portion having parallel longitudinal edges, a pair of bearing sleeves at one longitudinal extremity of the body portion and in alignment with one edge, bushings in said sleeves having closed, remote faces, antifriction bearings in said bushings, a pin supported at its ends in said bearings, said pin having a flat intermediate portion parallel to its axis, the pin axis being substantially coplanar with the wheel-engaging portion of said main body portion, and a hook member rigidly connected with said sleeves and having its axis in alignment with the other of said longitudinal edges.

6. A track shoe for the belt of a track-laying vehicle, a main body portion having parallel longitudinal edges and a generally flat wheel-engaging surface, first and second pairs of sleeves, the sleeves of each pair being fixed to said portion in spaced relation at the respective ends of one said longitudinal edge, the axes of all said sleeves being in alignment with said one edge, a bearing pin journaled in and between each pair of sleeves, respectively, said pin having a flat surface thereon intermediate its ends, a pair of hooks each having an inner surface adapted to fit over and mate with the flat surface of the corresponding pin of a next adjacent shoe, straps integral with and extending from each said pair of sleeves, the straps from each pair of sleeves being integral with and mounting a respective hook between them, both said hooks being in alignment with the other edge of said main body portion.

7. In a track shoe for the belt of a track-laying vehicle, a body portion having first and second parallel longitudinal edges, a pair of spaced sleeves having their common axis aligned with said first edge at one end thereof and adapted to journal a bearing pin between them, a hook member adapted to hook over and be rigidly detachably connected with the bearing pin of a next succeeding shoe, said hook member having its central axis in substantial alignment with said second longitudinal axis.

8. A track shoe as recited in claim 4, and a grouser integral with and connecting said sleeves in a plane offset below the lower surface of said main wheel-engaging portion.

9. In a shoe for the belt of a track-laying vehicle, a main body portion, a pair of aligned bearing sleeves integral with said portion, a bearing pin journaled in and between said sleeves and having a medial portion removed to form a flat surface, a hook member integral with said portion and having a complemental flat inner surface to hook over and mate with the flat surface of the pin of a next adjacent shoe between the bearing sleeves thereof, and means for rigidly and detachably securing together in mating relation said member and the pin of a next adjacent shoe.

10. In a track shoe for the belt of a track-laying vehicle, a main body portion having generally parallel first and second edges, a pair of spaced bearing sleeves fixed to one end of said portion and having a common axis substantially coincident with one edge of said portion, a bearing pin journaled at its ends in and between said sleeves and having a flat medial portion, and a hook member integral with said portion and having its axis substantially coincident with the other edge of said portion, said hook member having a flat inner surface mating with the flat medial portion of a next adjacent pin, and means for rigidly and detachably securing said hook member to the pin of a next adjacent shoe with their mating surfaces in contact.

HARRY A. KNOX.

REFERENCES CITED

The following references are of record in the file of this patent:

UNITED STATES PATENTS

| Number | Name | Date |
|---|---|---|
| 1,789,814 | George | Jan. 20, 1931 |
| 1,835,627 | Bauer | Dec. 8, 1931 |
| 2,342,675 | Knox | Feb. 29, 1944 |
| 2,425,219 | Armington | Aug. 5, 1947 |